US011734503B2

(12) United States Patent
Goyal et al.

(10) Patent No.: US 11,734,503 B2
(45) Date of Patent: Aug. 22, 2023

(54) GENERATING CONVERSATION MODELS FROM DOCUMENTS

(71) Applicant: Citrix Systems, Inc., Fort Lauderdale, FL (US)

(72) Inventors: Ashish Goyal, Bangalore (IN); Aditya Chand, Cupertino, CA (US); Mariana Ortiz-Reyes, Santa Clara, CA (US); Nitin Kumar Mathur, Fort Lauderdale, FL (US)

( * ) Notice: Subject to any disclaimer, the term of this patent is extended or adjusted under 35 U.S.C. 154(b) by 113 days.

(21) Appl. No.: 17/514,683

(22) Filed: Oct. 29, 2021

(65) Prior Publication Data

US 2022/0050957 A1 Feb. 17, 2022

Related U.S. Application Data

(63) Continuation of application No. 15/977,641, filed on May 11, 2018, now Pat. No. 11,170,161.

(51) Int. Cl.
| | |
|---|---|
| *G06F 40/174* | (2020.01) |
| *G10L 15/32* | (2013.01) |
| *G10L 15/22* | (2006.01) |
| *H04L 51/02* | (2022.01) |
| *G10L 15/26* | (2006.01) |

(52) U.S. Cl.
CPC .......... *G06F 40/174* (2020.01); *G10L 15/22* (2013.01); *G10L 15/26* (2013.01); *G10L 15/32* (2013.01); *H04L 51/02* (2013.01); *G10L 2015/225* (2013.01)

(58) Field of Classification Search
CPC ....... G06F 40/174; G06F 40/30; G10L 15/22; G10L 15/26; G10L 15/32; G10L 2015/225; H04L 51/02
See application file for complete search history.

(56) References Cited

U.S. PATENT DOCUMENTS

| | | | | |
|---|---|---|---|---|
| 2011/0060587 | A1* | 3/2011 | Phillips | .................... G10L 15/30 704/235 |
| 2014/0122619 | A1* | 5/2014 | Duan | ....................... G06F 40/20 709/206 |
| 2015/0019214 | A1* | 1/2015 | Wang | ....................... G06N 3/02 704/232 |

(Continued)

OTHER PUBLICATIONS

"The Stanford Parser: A statistical parser", Stanford Natural Language Processing Group, downloaded May 11, 2018 from https://nlp.stanford.edu/software/lex-parser.shtml.

(Continued)

*Primary Examiner* — Michael Colucci (57) ABSTRACT

Methods and systems for generating conversation models from documents are described herein. A system may receive a document and generate a conversation model that may be deployed by a chatbot or other automated agent (e.g., voice assistant, messenger bot, etc.). The chatbot may use the conversation model to engage in a conversation with a user and obtain information from the user to complete the document. The system may generate questions to ask the user based on text in the document that indicates a request for information. Additionally, the system may provide instructions to a user via a chatbot. The instructions may be generated based on text in the document that explains how to fill out the document.

20 Claims, 5 Drawing Sheets

(56) References Cited

U.S. PATENT DOCUMENTS

| | | | |
|---|---|---|---|
| 2017/0243107 A1* | 8/2017 | Jolley | G06F 16/951 |
| 2018/0083901 A1* | 3/2018 | McGregor, Jr. | H04L 51/02 |
| 2018/0212904 A1* | 7/2018 | Smullen | H04L 67/02 |
| 2018/0358006 A1* | 12/2018 | McConnell | G06F 40/295 |
| 2019/0068526 A1* | 2/2019 | Xie | H04L 67/303 |
| 2019/0073348 A1* | 3/2019 | Cheesman | G06V 30/412 |
| 2019/0294394 A1* | 9/2019 | Oikawa | H04L 51/02 |
| 2019/0347326 A1* | 11/2019 | Kozhaya | G06F 40/30 |

OTHER PUBLICATIONS

"Chat Bots-Designing Intentsand Entities for your NLP Models", Brij Raj Singh, downloaded May 11, 2018 from https://medium.com/@brijrajsingh/chat-bots-designing-intents-and-entities-for-your-nlp-models-35c385b7730d.

* cited by examiner

GENERATING CONVERSATION MODELS FROM DOCUMENTS

CROSS REFERENCE TO RELATED APPLICATION

The present application is a continuation of U.S. patent application Ser. No. 15/977,641, filed May 11, 2018, entitled "Generating Conversation Models From Documents", which is hereby incorporated by reference in its entirety for all purposes.

FIELD

Aspects described herein generally relate to computers, natural language processing, computer vision, hardware and software. More specifically, one or more aspects of the disclosure relate to generating computerized conversation models from documents.

BACKGROUND

Many people are required to fill out forms, either on paper or on a computing device, for a variety of purposes. Many organizations (e.g., hospitals, governments, businesses, etc.) still use paper forms which can be tedious to fill out and place into a digital format. Oftentimes, to complete a form, a person must fill it out and then a member of an organization must enter the data in by hand. This can be costly and error prone. A system that addresses these issues may be desired.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards using a document to generate a conversation model that may be deployed in a chat bot or other automated system (e.g., voice assistant, messenger bot, etc.). A system may receive a document image, e.g., a PDF, JPG, PNG, or the like. Through various optical character recognition and natural language processing techniques, the system may generate a conversation model that includes questions to ask a user and instructions to provide to a user in a conversation. The system may improve a conversation model as it engages in conversations with users. The system may also improve the conversation model using conversation models for related documents. The system may also determine related documents and may recommend to the user that the related documents be filled out or completed as well. The system may engage in a conversation with the user based on the related documents, to construct a response set for the user based on the document.

In one aspect, a computer implemented method may include receiving, by a computing device, a first document image; determining an input location within the first document image; identifying, within the first document image, text corresponding to the input location; generating, based on the text, a first conversation model comprising a question; engaging, by the computing device and based on the first conversation model, in a conversation with a user to query the user based on the question; and receiving input from the user, wherein the input is responsive to the question.

The method may further include updating the first conversation model based on the input from the user.

The method may further include identifying a second conversation model corresponding to a second document image, wherein a comparison between the first document image and a second document image satisfies a similarity threshold; and adding content from the second conversation model to the first conversation model.

The method may further include replacing a first content in the first conversation model with a second content from the second conversation model.

The replacing a first content in the first conversation model with a second content from the second conversation model may include determining, based on an aggregation of user responses to the first content, a rating of the first content; and replacing the first content with the second content based on a comparison between the rating of the first content and a rating of the second content.

The method may further include, identifying text corresponding to the input location based on a detection of a line extending from an area adjacent to the input location to an area adjacent to the text.

The method may further include generating, based on text corresponding to a second location that requires input from a second user, a second question; and initiating a dialogue with the second user, using the second question.

The method may further include identifying explanatory text within the first document image; and adding to the first conversation model, dialogue corresponding to the explanatory text.

The method may further include receiving, during the conversation, a question from the user; and answering, based on the dialogue corresponding to the explanatory text, the question from the user.

The method may further include determining, by the computing device and based on the question, a data validation model; and after determining, based on the data validation model, that the input from the user is not valid, providing output to the user based on the explanatory text.

In one aspect the present invention includes a computer implemented method may include receiving, by a computing device, a first document; generating first document text by performing optical character recognition on the first document; identifying, by the computing device and using natural language processing, explanatory text and interrogatory text within the first document text; generating a conversation model based on the explanatory text and interrogatory text; and engaging, by the computing device and based on the conversation model, in a conversation with a user.

The method may further include engaging in a conversation with a user by using the conversation model in a chatbot to converse with the user.

The method may further include receiving a response from the user that indicates the user desires a clarification; identifying an explanation within the conversation model that corresponds to an intent of the response from the user; and providing, via the chatbot, the explanation to the user.

The method may further include receiving a response from the user, wherein the response is unrelated to the conversation model; identifying a second conversation model related to the response, wherein the second conversation model is based on a second document; and continuing, based on the second conversation model, the conversation with the user.

The method may further include determining a second document that is related to the first document; and initiating a dialogue with a user based on a second conversation model that is generated from the second document.

In one aspect the present invention includes a system comprising a document engine that receives a computerized image of a first document, and generates, based on the first document, a question and an instruction corresponding to the question; a conversation model generator that creates a first conversation model comprising the question, the instruction, and an expected answer format for a response to the question; a plurality of chatbot generators, each configured to automatically create a chatbot for a different one of a plurality of different communication interfaces, wherein the chatbot is configured to engage in a conversation with a user according to the first conversation model; and a back-end handler that triggers a workflow in response to completing a conversation with a user, wherein the workflow includes a response of the user to the question.

The plurality of different communication interfaces may include an instant messenger, and a voice-activated personal assistant.

The conversation model generator may be configured to identify a second conversation model corresponding to a second document based on a comparison between the first document and the second document satisfying a similarity threshold; and add content from the second conversation model to the first conversation model.

The conversation model generator may be configured to update the conversation model based on input from the user.

The document engine may be configured to identify a second document that is related to the first document, and the chatbot may be configured to initiate a dialogue with a user based on a second conversation model that is generated from the second document.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards using a document to generate a conversation model that may be deployed in a chat bot or other automated system (e.g., voice assistant, messenger bot, etc.). A system may receive a document image, e.g., a PDF, JPG, PNG, or the like. Through various optical character recognition and natural language processing techniques, the system may generate a conversation model that includes questions to ask a user and instructions to provide to a user in a conversation. The system may improve a conversation model as it engages in conversations with users. The system may also improve the conversation model using conversation models for related documents. The system may also determine related documents and may recommend to the user that the related documents be filled out or completed as well. The system may engage in a conversation with the user based on the related documents, to construct a response set for the user based on the document.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
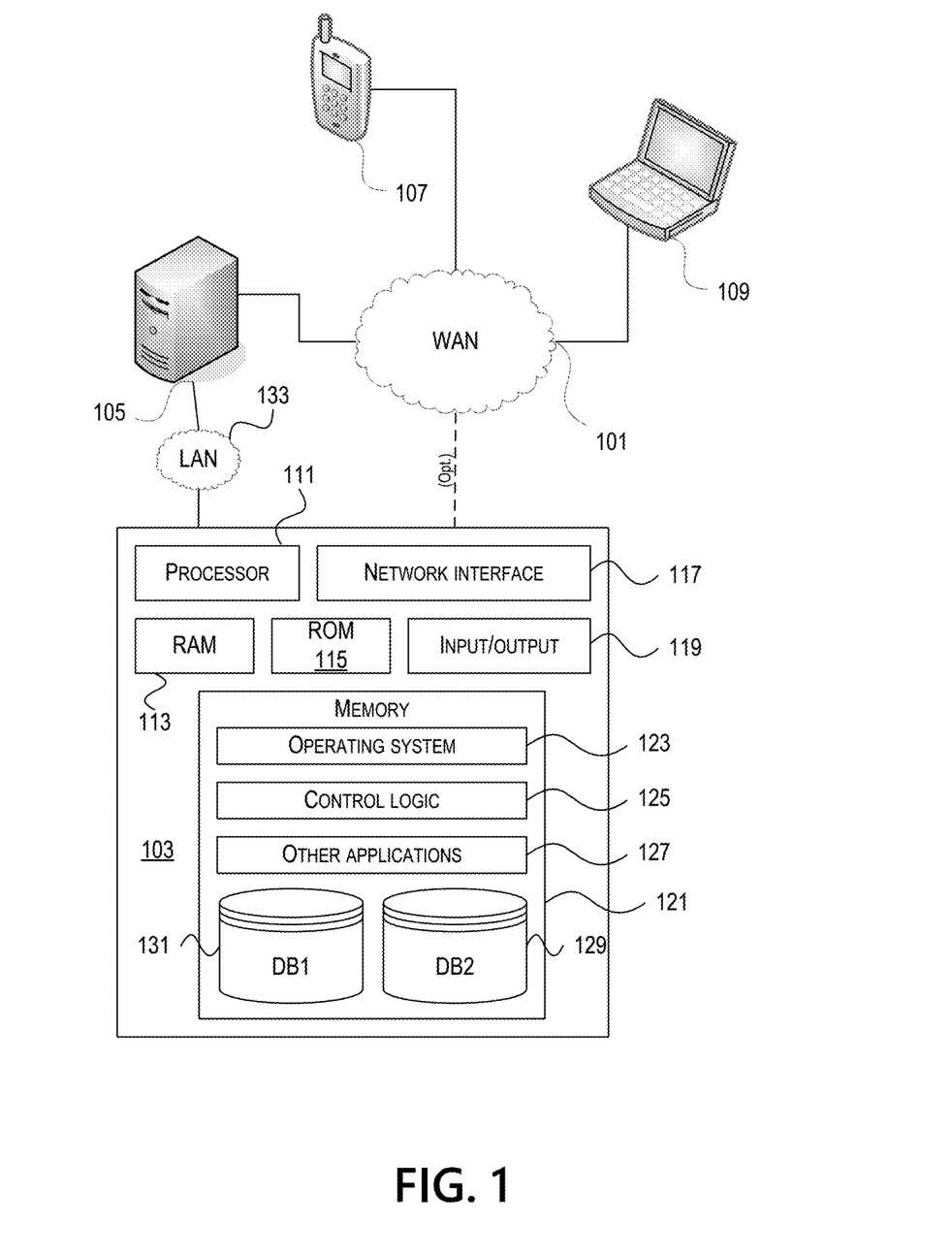
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
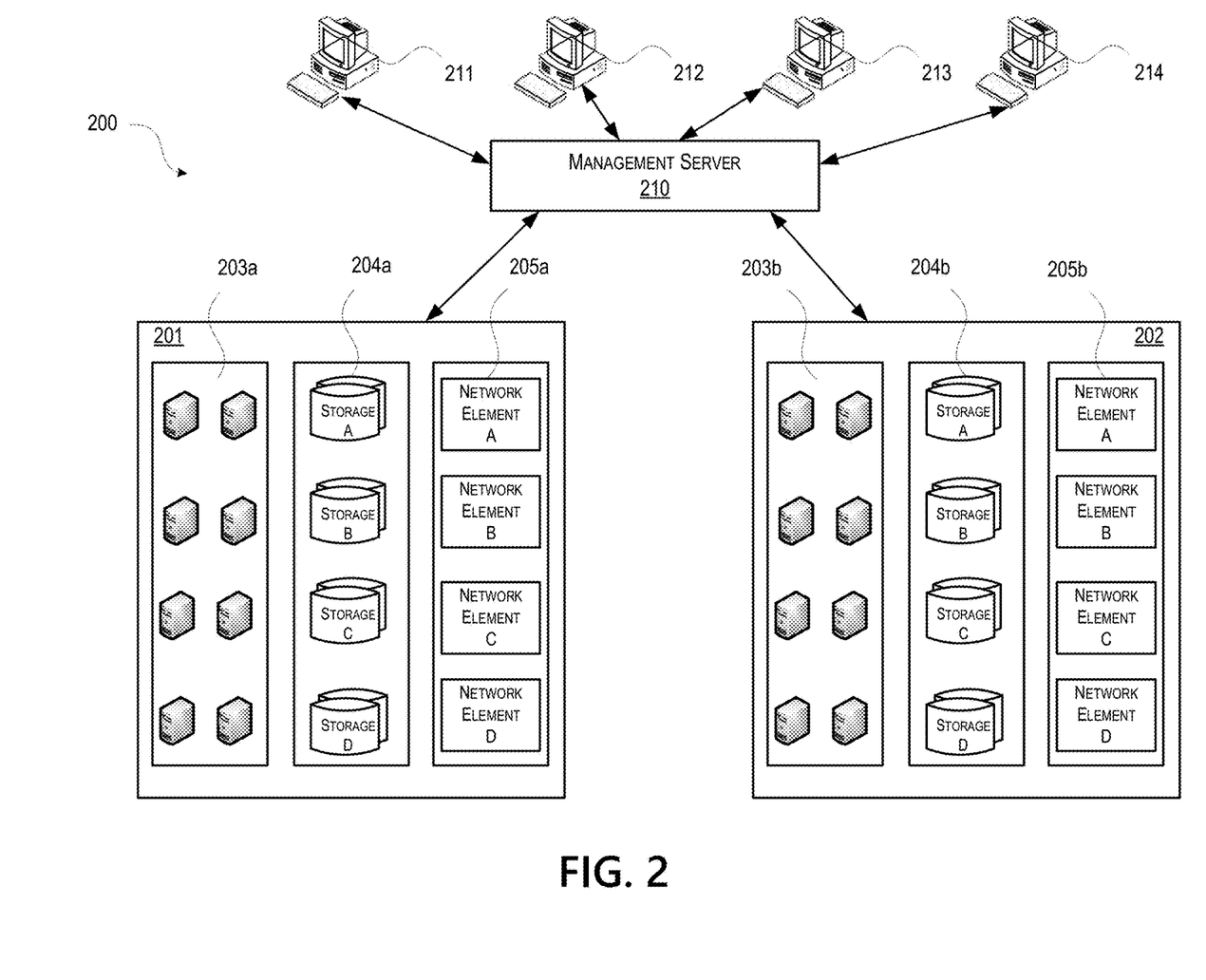
FIG. 2 depicts an illustrative cloud-based system architecture that may be used in accordance with one or more illustrative aspects described herein.

With further reference to FIG. 2, some aspects described herein may be implemented in a cloud-based environment. FIG. 2 illustrates an example of a cloud computing environment (or cloud system) 200. As seen in FIG. 2, client computers 211-214 may communicate with a cloud management server 210 to access the computing resources (e.g., host servers 203a-203b (generally referred herein as "host servers 203"), storage resources 204a-204b (generally referred herein as "storage resources 204"), and network resources 205a-205b (generally referred herein as "network resources 205")) of the cloud system.

Management server 210 may be implemented on one or more physical servers. The management server 210 may run, for example, CLOUDPLATFORM by Citrix Systems, Inc. of Ft. Lauderdale, Fla., or OPENSTACK, among others. Management server 210 may manage various computing resources, including cloud hardware and software resources, for example, host computers 203, data storage devices 204, and networking devices 205. The cloud hardware and software resources may include private and/or public components. For example, a cloud may be configured as a private cloud to be used by one or more particular customers or client computers 211-214 and/or over a private network. In other embodiments, public clouds or hybrid public-private clouds may be used by other customers over an open or hybrid networks.

Management server 210 may be configured to provide user interfaces through which cloud operators and cloud customers may interact with the cloud system 200. For example, the management server 210 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 210 also may include a set of APIs and/or one or more customer console applications with user interfaces configured to receive cloud computing requests from end users via client computers 211-214, for example, requests to create, modify, or destroy virtual machines within the cloud. Client computers 211-214 may connect to management server 210 via the Internet or some other communication network, and may request access to one or more of the computing resources managed by management server 210. In response to client requests, the management server 210 may include a resource manager configured to select and provision physical resources in the hardware layer of the cloud system based on the client requests. For example, the management server 210 and additional components of the cloud system may be configured to provision, create, and manage virtual machines and their operating environments (e.g., hypervisors, storage resources, services offered by the network elements, etc.) for customers at client computers 211-214, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 211-214 may be related, for example, different client computers creating virtual machines on behalf of the same end user, or different users affiliated with the same company or organization. In other examples, certain clients 211-214 may be unrelated, such as users affiliated with different companies or organizations. For unrelated clients, information on the virtual machines or storage of any one user may be hidden from other users.

Referring now to the physical hardware layer of a cloud computing environment, availability zones 201-202 (or zones) may refer to a collocated set of physical computing resources. Zones may be geographically separated from other zones in the overall cloud of computing resources. For example, zone 201 may be a first cloud datacenter located in California, and zone 202 may be a second cloud datacenter located in Florida. Management server 210 may be located at one of the availability zones, or at a separate location. Each zone may include an internal network that interfaces with devices that are outside of the zone, such as the management server 210, through a gateway. End users of the cloud (e.g., clients 211-214) might or might not be aware of the distinctions between zones. For example, an end user may request the creation of a virtual machine having a specified amount of memory, processing power, and network capabilities. The management server 210 may respond to the user's request and may allocate the resources to create the virtual machine without the user knowing whether the virtual machine was created using resources from zone 201 or zone 202. In other examples, the cloud system may allow end users to request that virtual machines (or other cloud resources) are allocated in a specific zone or on specific resources 203-205 within a zone.

In this example, each zone 201-202 may include an arrangement of various physical hardware components (or computing resources) 203-205, for example, physical hosting resources (or processing resources), physical network resources, physical storage resources, switches, and additional hardware resources that may be used to provide cloud computing services to customers. The physical hosting resources in a cloud zone 201-202 may include one or more computer servers 203, such as the virtualization servers 301 described above, which may be configured to create and host virtual machine instances. The physical network resources in a cloud zone 201 or 202 may include one or more network elements 205 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 201-202 may include storage disks (e.g., solid state drives (SSDs), magnetic hard disks, etc.) and other storage devices.

Figure 3:
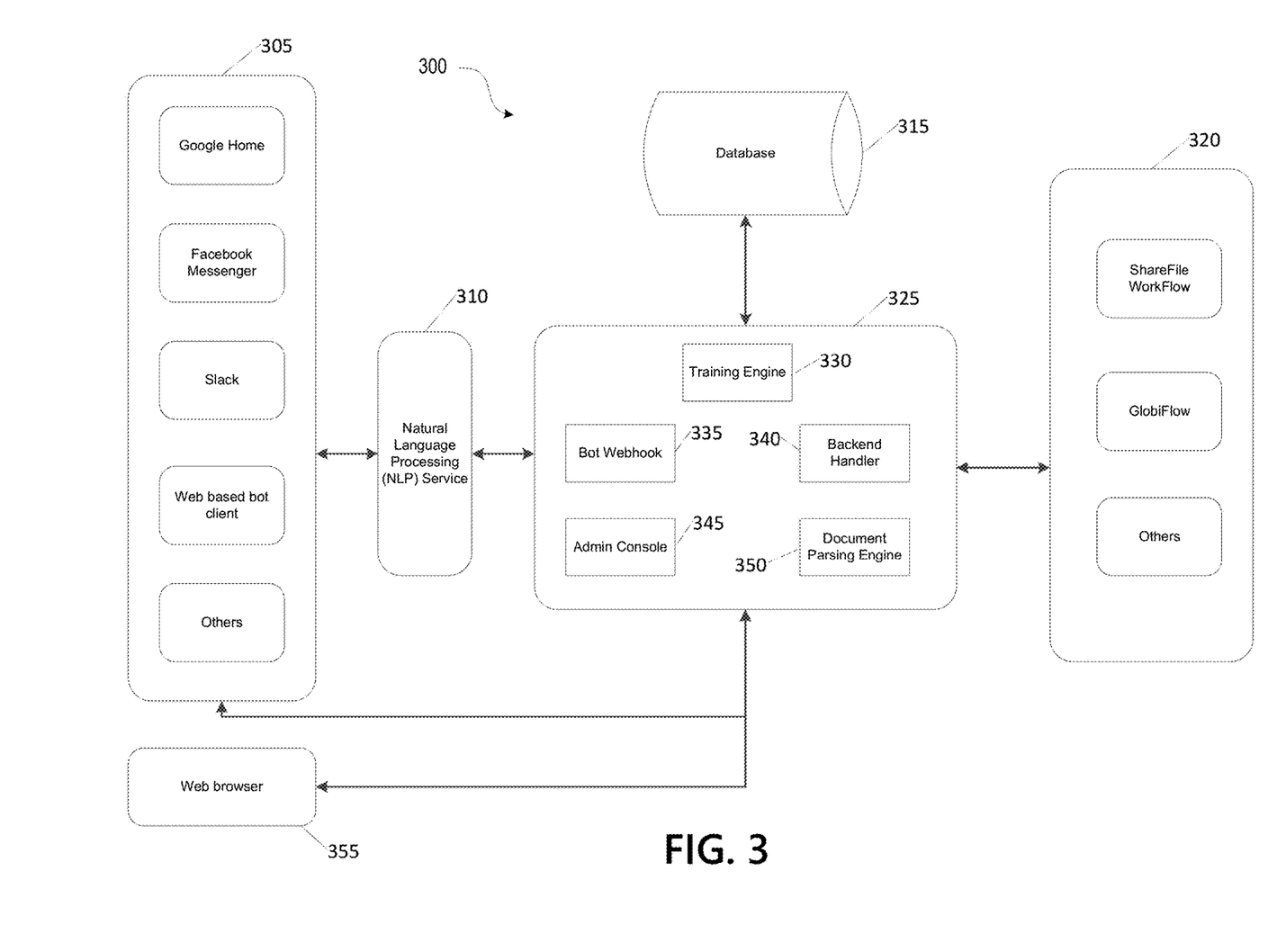
FIG. 3 depicts an illustrative system for generating conversation models and chat bots based on documents.

The example cloud computing environment shown in FIG. 2 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 203 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Generating Conversation Models from Documents

FIG. 3 depicts an illustrative system 300 for generating conversation models and chat bots based on form documents. A user may use web browser 355 to connect to admin console 345 and upload a document. The document may form the basis of a conversation between the user and the system 300. The information discussed during the conversation may be used to complete the document that was uploaded. After a document is uploaded, the document may be received by the document parsing engine 350. The parsing engine 350 may use optical character recognition to convert the document to a computer readable format. The training engine 330 may use machine learning to create a conversation model from the document.

The bot client interface 305 may send messages from a user to the bot webhook 335 via the NLP service 310. The bot client interface 305 may be any type of chat interface including Google Home, Amazon Alexa, Facebook Messenger, Slack, or any other Web based bot client. The bot webhook 335 may handle requests from the bot client interface 305. The natural language processing (NLP) service 310 may help determine the intent of messages from users based on a conversation model generated by the training engine 330. The training engine 330 may also create intents for each input area in a document. The input area intent may include details about the input required for the input area as well as actions to be performed once input is received for the input area. For example, the input area intent may indicate what type of validation should be performed when input is received. The intent may also indicate what follow up questions should be asked after receiving input. The intent may also indicate that a third party workflow be triggered when input is received. The NLP service 310 may generate structured data comprising the intent of a user's message. The service 325 may receive the structured data generated by the NLP service 310 and perform further processing using the structured data. For example, the training engine 330 may use the structured data to update the conversation model or identify other conversation models related to the intent of the user's message. The database 315 may be used for storing document template details, conversation models, and other configuration data.

The backend handler 340 may be configured to communicate with a workflow engine 320 (e.g., ShareFile Workflow, GlobiFlow, etc.) to trigger a workflow when a form is completed by the system. A workflow may include, for example, the definition, execution and automation of a business process where tasks, information, or documents are passed from one participant to another for action, according to a set of procedural rules. The system may also trigger a web hook and pass the form submission data to a separate module.

As an example, the system 300 may launch a chat bot via the bot client interface 305. A user may send a message to the bot client interface 305 stating "I want to return my shoes." The message may be forwarded to NLP service 310, where an intent is identified that triggers the use of a return form document. The service 325 may identify a conversation model that was generated using a return form. The NLP service 310 may fetch questions from the conversation model that the user may answer for the user's request to be processed (e.g., questions regarding the confirmation number and product identification number). The NLP service 310 may then ask for the confirmation number and product identification number and may receive the information from the user. The NLP service 310 may send the information received to service 325. Service 325 may send a summary of the user's request with confirmation buttons via the bot client interface 305 to the user. The user may verify the summary and the service 325 may trigger the workflow to process the shoe return.

Figure 4:
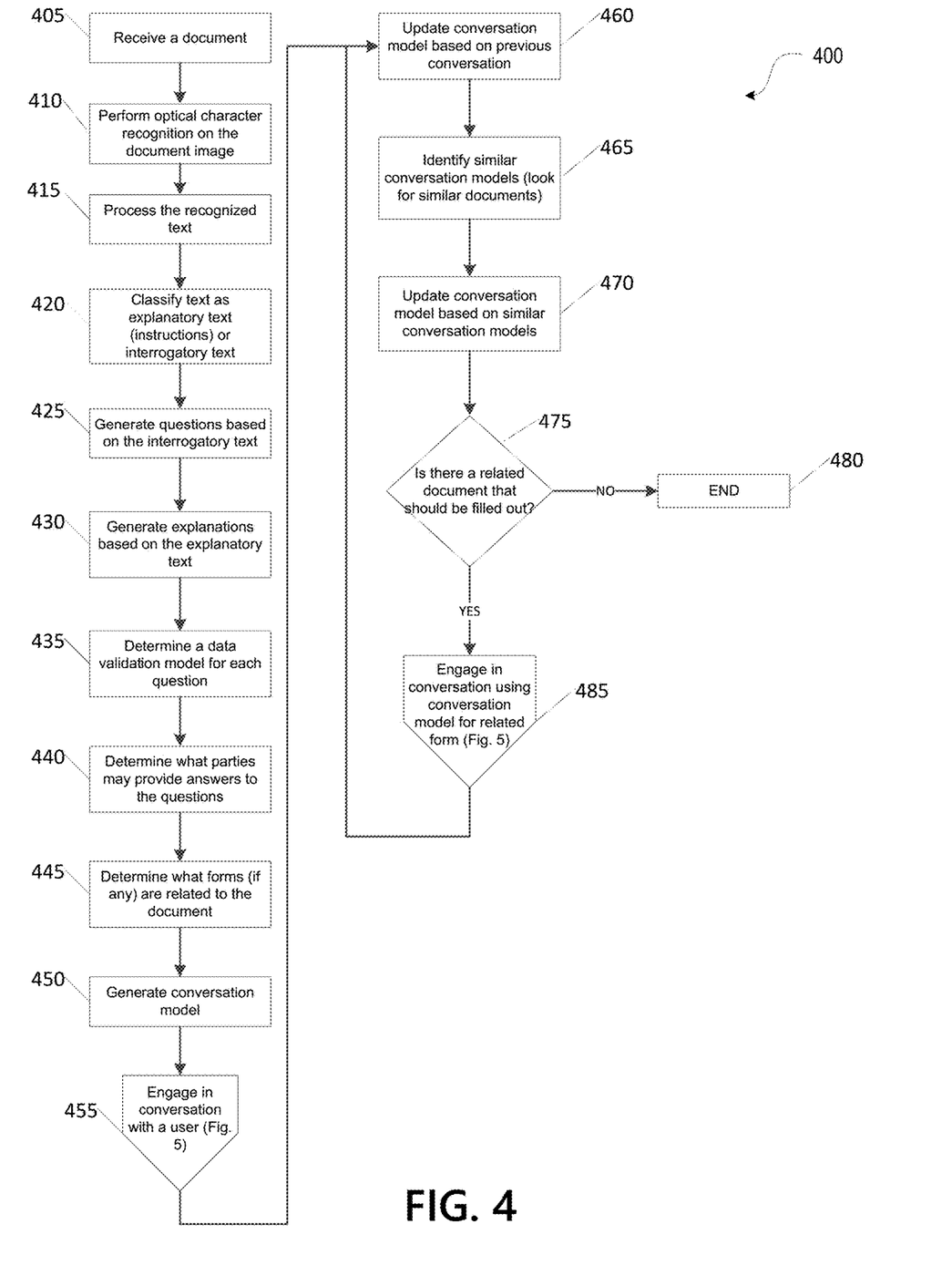
FIG. 4 depicts an illustrative method for generating a conversation model from a document.

FIG. 4 depicts an illustrative method for generating a conversation model from a document. In one or more embodiments, one or more steps illustrated in FIG. 4 may be performed by one or more computing devices, entities, or systems. For example, portions of the steps illustrated in FIG. 4 may be performed by one or more computing devices, such as data server 103, web server 105, client computer 107, client computer 109, or by one or more elements of FIG. 2 or FIG. 3. The steps illustrated in FIG. 4 may be embodied in computer-executable instructions that are stored in a computer-readable medium, such as a non-transitory computer readable medium. The steps illustrated in FIG. 4 need not all be performed in the order specified, and some steps may be omitted or changed in order.

In step 405, a computing system may receive a document. The document may be in any format including data visualization file formats (e.g., .viz), any type of image format (JPG, PNG, GIF, etc.), PDF, Word document, Excel spreadsheet, etc. The document may have any kind of feature including text fields, check box fields, radio buttons, signature fields, date fields, text areas, number fields, address fields, image fields, etc. The document may be a form document with fields that have historically been filled out by hand.

In step 410, the system may perform optical character recognition on the document image to determine what is written on the document. The system may also use a handwriting recognizer if it determines that the document contains handwritten text.

In step 415, the system may process the recognized text. The processing may include using machine learning and natural language processing techniques to parse the text. Parsing the text may include analyzing the grammatical structure of the text to determine the meaning of the text. When parsing the text, the system may determine which groups of words belong together as phrases. The parsing may also involve determining the part of speech of words in the text and whether a word in the text is a named entity.

Additionally or alternatively the processing may include creating vector representations of words, phrases, sentences, paragraphs, or the entire document. When vector representations of text are created, text with similar semantic meaning and/or syntactic structure may be mapped to similar vectors. Two sentences that have similar meaning (but use different individual words) may be mapped to similar vectors. Thus, a computer can determine that the two sentences have similar meaning despite a lack of string equivalency. Vector representations of text can be created using machine learning algorithms (e.g., neural networks). Parsing text may involve using a deep neural network and vector representations of text as input.

In step 420, the system may classify text as explanatory text or interrogatory text. Explanatory text may include instructions for filling out a document. Interrogatory text may include the parts of a document that ask for information or indicate that information be filled in by a user. The machine learning algorithm may take as input (for training and prediction) the results of the parsing from step 415 (e.g., a parse tree or other data showing the relationships between words in the document) and/or text embeddings (i.e., vector representations of the document text). The machine learning algorithm may be a supervised, unsupervised, or reinforcement machine learning algorithm. The data set used for training the machine learning algorithm may include many documents from a variety of industries and may be organized in a structured format. The machine learning algorithm may also take into account various factors such as the language of the document, what country the document is from, etc., during training and prediction.

To train the system 300 to distinguish between explanatory and interrogatory text, a supervised machine learning algorithm may take as input, text that has been labeled as explanatory or interrogatory. The input for the machine learning algorithm may also include results from parsing in step 415 including parse trees. The input for the machine learning algorithm may also include vector representations of the text. Using the machine learning algorithm, the system may learn how to distinguish between text in a document that is explanatory and text that is interrogatory.

Alternatively or additionally, the system may use computer vision and image processing techniques to classify text as explanatory text or interrogatory text. The system may train a machine learning algorithm such as a deep neural network (e.g., a convolutional neural network) to recognize lines, text, and locations that indicate a user should enter information (e.g., areas left blank for typing or writing information). It may use a training set comprising documents that have been labeled by people. Different portions of the labeled documents may have been labeled as lines, spaces, text, boxes, text fields, check box fields, radio buttons, signature fields, date fields, text areas, number fields, address fields, image fields, or any other feature in a document. Locations within the labeled documents that contain explanatory text may be labeled as containing explanatory text. Locations within the labeled document that contain interrogatory text may be labeled as containing interrogatory text. Locations within the labeled document that contain a mixture of interrogatory and explanatory text may be labeled as containing both. The system may use the training set in a machine learning algorithm to learn to classify text as interrogatory or explanatory.

Additionally or alternatively the system may determine that text is interrogatory when it detects text that is adjacent to input areas (e.g., blank lines, blank boxes, or other areas that indicate information should be entered). The system may determine that a portion of text is interrogatory if it satisfies a distance threshold between the input area and the portion of text. The system may also determine locations where lines, including dotted lines, end. If there is text within a predetermined distance from one end of a line and there is an input area at the other end of the line, the system may determine that the text is interrogatory.

The machine learning algorithm used by the system may also be trained separately for a variety of industries using documents that are found in each industry. For example, the system may train a machine learning algorithm on insurance documents. When a new document is uploaded to the system, the system may determine what industry it belongs to and use a machine learning model that has been specifically trained for the relevant industry. To determine what industry a new document belongs to, the system may use topic modeling to determine the distribution of topics in the new document and compare it with the topic distributions of other documents. The system may also use document clustering techniques to determine what industry a new document belongs to. There may be separate algorithms trained for different industries. For example the system may use one algorithm for mortgage documents and a different algorithm for medical documents.

The system may also determine what explanations go with what interrogatories. The system may analyze the document using computer vision or image processing techniques to determine locations in the document where explanatory text and interrogatory text are located. The system may then link together explanatory text and interrogatory text that are adjacent to each other.

Additionally or alternatively the system may compare words contained in portions of the explanatory text with words contained in portions of the interrogatory text. If portions of the explanatory text use some of the same words as portions of the interrogatory text, then the system may link the two portions together. The system may also compare vector representations of portions of the interrogatory text and explanatory text to determine how similar the portions are. If the similarity metric (e.g., cosine distance or other metric) satisfies a threshold, then the system may link the explanatory portion with the interrogatory portion.

Additionally or alternatively the system may determine what explanatory text goes with what interrogatory text by using topic modeling algorithms (e.g., latent Dirichlet allocation, anchor words, or other algorithms using singular value decomposition or non-negative matrix factorization). The system may use a topic modeling algorithm to determine the topics or topic distribution in each portion of explanatory and interrogatory text. If a comparison of the topics or topic distribution of a pair of explanatory text and interrogatory text satisfies a similarity threshold then the system may determine that the pair goes together (the system may link the two portions of text). Step 420 may be performed by the training engine 330.

In step 425, the system may generate questions based on the interrogatory text. The system may determine what part of speech the interrogatory text is. The system may determine what question word (what, when, where, who, whom, why, and how) to use in a question based on the part of speech of the interrogatory text. The system may maintain a list of questions, each question having a corresponding interrogatory text. The list may include questions and interrogatory text from many different documents Alternatively or additionally, the system may parse the interrogatory text and determine an intent of the text. The system may then use the intent of the interrogatory text to generate a question or match the intent to an intent of an existing question that the system has access to or has previously generated. The system may then associate the matching question with the interrogatory text.

In step 430, the system may generate explanations based on the explanatory text. Generating explanations may include formatting the text into user friendly format. In addition the system may use NLP summarization techniques to generate a summary of the document to present to a user at the beginning of a conversation or when the user asks a question about the document.

In step 435, the system may determine a data validation model for each question. The system may determine what types of response formats would be valid based on the intent of each question. The system may choose an existing data validation model or generate a new validation model. The validation model may assist the system 300 in determining whether a proper format was used in an answer from a user. For example, if an input area on a document is adjacent to the text "Birthdate," the system may generate a question that says "What is your birth date?" or "When were you born?" The system may choose a date validation model for the question because it determines that "when" or "date" corresponds to a date. If the question corresponds to an address, the system may look up the address in a directory to determine whether the address is a valid address or not. If the question is open response (e.g., where the user is directed to describe something using sentences) then the system may use a validation model that checks that the response is long enough.

In step 440, the system may determine what parties may provide answers to the questions. Portions of the labeled documents (described in step 420) may also be labeled with what kind of person or organization should be filling in different input areas. For example, some forms require that a user fill out much of the form but reserve an area that is to be filled out by an organization that is administering the form. The system may learn, by training a machine learning algorithm using the labeled documents, to determine which organizations or users need to fill out which parts of a document.

In step 445, the system may determine what forms (if any) are related to the document. Given a large corpus of documents the system may cluster the documents to determine relations between documents. Documents belonging to the same cluster may be determined to be related to each other. The system may cluster the documents using any clustering algorithm (e.g., K-means, affinity propagation, mean-shift, spectral clustering, Ward hierarchical clustering, agglomerative clustering, density-based spatial clustering of applications with noise (DBSCAN), Gaussian mixtures, Birch, etc.). The clustering algorithm may use the words in each document to determine how documents should be clustered. For example, a term frequency inverse document frequency or other vector representation of the words in the documents may be used to compute distances between the documents in a clustering algorithm.

Additionally or alternatively, the system may determine relationships between the documents by determining which documents reference other documents. The system 300 may use a tree data structure for keeping track of the relationships between documents. The system may identify form numbers or names within each document and may determine two documents are related if one document references the other document. If a first document references a second document, the second document may be stored in a tree structure as a leaf node stemming from the first document. As new documents are added, the system may determine what documents are related to the new documents.

In step 450, the system may generate a conversation model for the document. The conversation model may be deployable by a chat bot that interacts with a user. The conversation model may include the questions generated in step 425, the explanations generated in step 430, and metadata that indicates in what type of situation a question or explanation should be asked.

Figure 5:
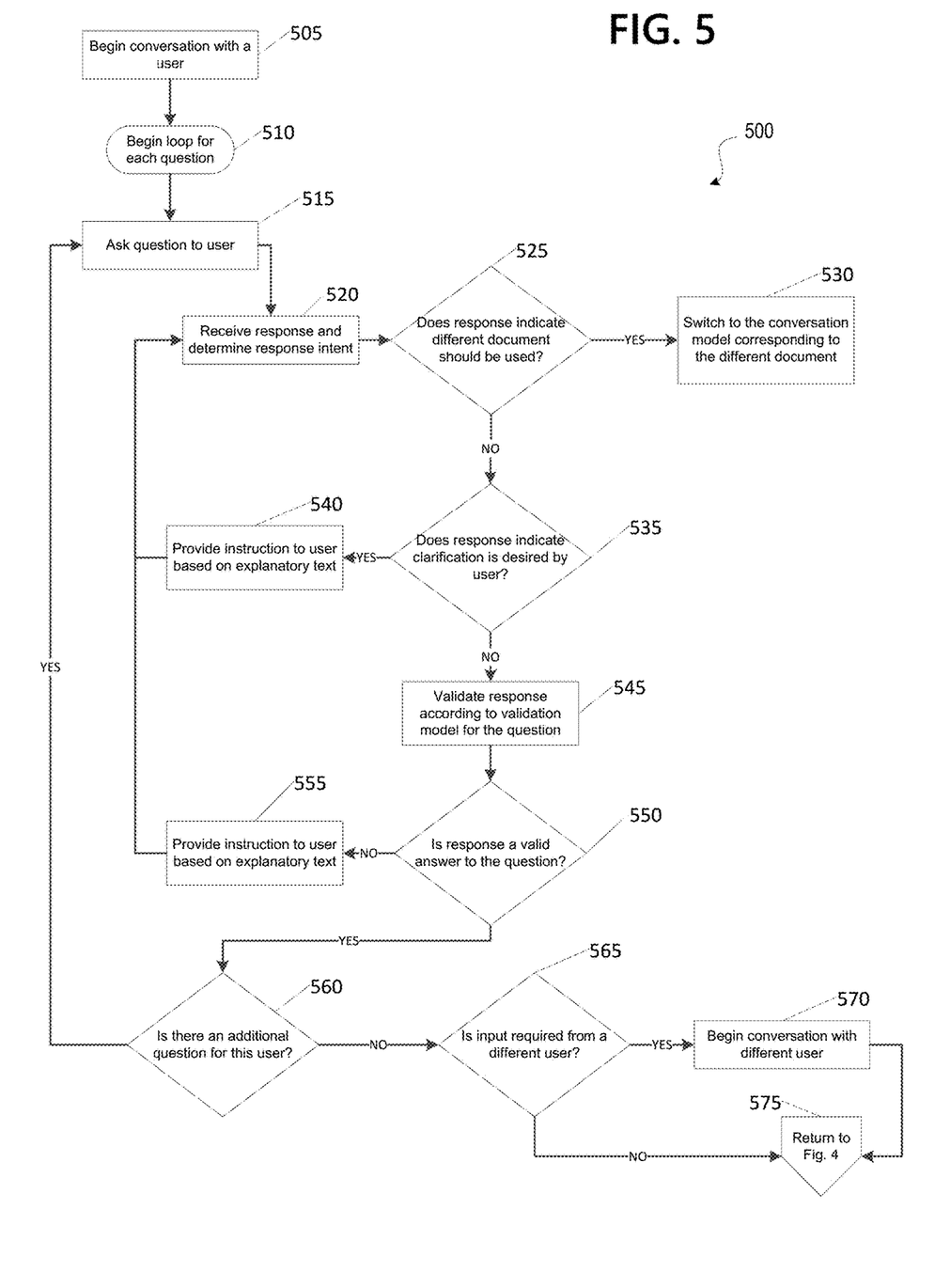
FIG. 5 depicts an illustrative method for a computer to engage in a conversation using a conversation model generated from a document.

In step 455, the system may engage in a conversation with a user as shown in FIG. 5. The conversation may be initiated by a user. For example, a user may send a query to the bot client interface 305. The NLP service 310 may match the query with an intent that corresponds to a particular document and associated conversation model. After the intent is matched the system may engage in a conversation with the user as shown in FIG. 5.

In step 460, the system may update the conversation model for the document based on a conversation that occurs during step 455. Updating the conversation model may include adding additional interrogatories or explanations, modifying interrogatories or explanations, and/or deleting interrogatories or explanations. The system may update the model using text that is written when a user replaces the chat bot in a conversation as described below in steps 540 and 555.

In step 465, the system may identify conversation models that are similar to the conversation model for the current document. The system may use the same techniques described in step 445 to determine whether conversation models are similar to each other. Alternatively, the system may determine questions that are similar to each other by comparing vector representations of each question with questions in other conversation models (e.g., using cosine distance to determine if the questions satisfy a similarity threshold).

In step 470, the system may update the conversation model using the identified similar conversation models or questions. The system may use a rating system to determine whether a portion of a conversation model should be updated or not. The system may keep a rating on how effective an explanation or question is based on how the user responds to the question or explanation during a conversation. The rating may be based on a variety of factors including how often a user requires a clarification after a question is asked, how often a user provides an incorrect response to a question, how often a human operator must take over for a chat bot after the chat bot asks a particular question or provides a response. For example, if a question asked by the system often results with a user providing a response that fails the validation model, it may be an indication that the question is poor. This type of question may receive a lower rating. Questions that rarely result with desires for clarifications from the user may receive a higher rating. Similarly, explanations that rarely lead to a human operator needing to take over for the chat bot may receive a higher rating. Thus, each question and explanation may receive a rating indicating how effective they are. If the system determines that a similar question or explanation has a higher rating than the question or explanation in the current conversation model, then the system may replace the lower rated question or explanation with the higher rated one.

Additionally or alternatively the system may add content from one conversation model to another. For example, the system may determine that an explanation in one conversation model is similar to an explanation in a second conversation model. If the content satisfies a similarity threshold then it may be added to the second conversation model. Similarity calculations and thresholds may be performed using vector representations of the text in combination with cosine distance or other similarity or distance metrics. For example, a threshold for adding content may be set to a cosine distance between 0.2 and 0.4. Thus, if the comparison (using vector representations) between an explanation from a first conversation model and an explanation from a second conversation model shows a cosine distance of 0.3, the content item from the first conversation model may be added to the second conversation model (and vice versa).

In step 475, the system may determine whether there is a related document that should be filled out by the user from step 455. In step 480, if there is no related form the system may end its task. In step 485, if there is a related document the system may engage in a conversation with the user using the conversation model for the related document according to FIG. 5. After completing a conversation using the conversation model for the related document, the system may perform steps 460-475 using the related document and its corresponding conversation model.

Additionally, upon completion of a conversation, the system 300 may fill in the document with the answers provided by a user. The system may also trigger a workflow based on the answers or completed document. For example, the backend handler 340 may trigger a shoe return process with the workflow engine 320 after the system completes a conversation corresponding to a return document.

FIG. 5 depicts an illustrative method for a computer to engage in a conversation based on a document. In one or more embodiments, one or more steps illustrated in FIG. 5 may be performed by one or more computing devices or entities. For example, portions of the steps illustrated in FIG. 5 may be performed by one or more computing devices, such as data server 103, web server 105, client computer 107, client computer 109, or by one or more elements of FIGS. 2-3. The steps illustrated in FIG. 5 may be embodied in computer-executable instructions that are stored in a computer-readable medium, such as a non-transitory computer readable medium. The steps illustrated in FIG. 5 need not all be performed in the order specified, and some steps may be omitted or changed in order.

In step 505, the system may begin a conversation with a user. The conversation may be based on a conversation model for a document. In step 510, the system may begin a loop that iterates over the questions contained in the conversation model. In step 515, the system may ask a question to a user.

In step 520, the system may receive a response from the user and may determine the intent of the response. The intent may be determined using natural language processing techniques.

In step 525, the system may determine whether the response from the user indicates that a different document should be used as the source of the conversation model. For example, the user may change her mind, realize she made a mistake, or may determine that the wrong form is being filled out based on questions asked by the system. If the system determines that a different document should be used, then the system may switch to a different document and continue with step 505 using the conversation model corresponding to the different document.

If the system does not determine that a different document should be used, the system may continue to step 535 and determine whether the response indicates clarification is desired by the user.

If the system determines that clarification is desired by the user, the system may proceed to step 540 and provide instructions to the user based on explanatory text contained in the document. The instructions may include explanations generated in step 430 of FIG. 4. Additionally, the system may signal for an operator to take over for the chat bot if the system 300 determines that it does not have an explanation that is adequate for responding to the user's desire for clarification. After a clarification or instruction has been provided to the user, the system may ask the question again and return to step 520 to receive a response after clarification has been provided.

If the system determines that clarification is not desired by the user, the system may determine that the response from the user was an answer to the question. The system may proceed to step 545 and validate the response according to the validation model for the question. For example, the validation may be performed by the bot webhook 335. The bot webhook 335 may ask the user for correct input if any error is detected with the input. The validated data and intent details may be sent to the backend handler 325 to trigger a workflow.

In step 550 the system may determine whether the response is a valid answer to the question. If the system determines that the response is not valid then the system may proceed to step 555 and provide instructions to the user based on explanatory text contained in the document. The system may have determined an explanation that goes with the question the system asked (as described in step 420 of FIG. 4) and may provide the matching explanation to the user. Additionally, the system may signal for an operator to take over for the chat bot if the system determines that the explanations in the conversation model are insufficient for responding to a user. For example, the user may continue to ask questions after the system has provided all of its relevant explanations. As an additional example, the system may determine that the intent of a user's question may not match the intent of any explanations that the system has access to. In these situations, the system may transfer control to a human operator so that the operator may answer the user's question.

If the system determines that the response is a valid answer to the question, the system may proceed to step 560 and determine whether there is an additional question for the user it is currently engaged in a conversation with. If there is at least one additional question, then the system may return to step 515 to ask the next question to the user.

If there are no additional questions, then the system may determine whether the document requires input from a different user. The system may make this determination based on the parties it identified in step 440 of FIG. 4. The conversation model may identify, for each question, a party that is able to answer the question. If input is required from a different user then the system may proceed to step 570 and begin a conversation with the different user to receive answers to the questions corresponding to the different user.

If the system determines that input is not required from a different user, then the system may end the conversation with the user in step 575. The system may then proceed to step 460 in FIG. 4.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A device comprising:
   one or more processors; and
   memory storing computer-executable instructions that, when executed by at least one of the one or more processors, cause the device to:
   access a paper-based form document and expose an image of the paper-based form document to a chatbot, wherein the chatbot is configured to engage in a conversation, based on a first conversation model, with a first user, and wherein content of the image of the paper-based form document controls in part the conversation;
   set, based on a message from the first user in response to information provided by the chatbot, a response value for the information provided by the chatbot via a chat interface associated with the first conversation model; and
   render, based on the response value and to another conversation model, the information provided by the chatbot in the first conversation model.

2. The device of claim 1, wherein the rendering is further based on one or more responses received from the first user during the conversation.

3. The device of claim 1, wherein the conversation, based on the first conversation model and associated with the image of the paper-based form document, is an interactive conversation between the chatbot and the first user.

4. The device of claim 3, wherein the conversation between the chatbot and the first user comprises a request for the first user to verify the message.

5. The device of claim 1, wherein the first conversation model comprises explanatory text within the image of the paper-based form document and interrogatory text within the image of the paper-based form document.

6. The device of claim 5, wherein the instructions, when executed by the at least one processor, further cause the device to:
   parse the explanatory text within the image of the paper-based form document;
   parse the interrogatory text within the image of the paper-based form document; and
   generate vector representations of the explanatory text and vector representations of the interrogatory text.

7. The device of claim 6, wherein the instructions, when executed by the at least one processor, cause the device to:
   provide a plurality of chatbot generators, each configured to automatically create a chatbot for a different one of a plurality of different communication interfaces.

8. The device of claim 6, wherein the instructions, when executed by the at least one processor, cause the device to:
 determine, based on the interrogatory text and the explanatory text, a validation model for the information provided by the chatbot; and
 determine, based on the validation model and the information provided by the chatbot, that the message from the first user is valid.

9. The device of claim 8, wherein the instructions, when executed by the at least one processor, cause the device to:
 based on determining that the message from the first user is valid, provide, to the first user and by the chatbot, additional information.

10. The device of claim 1, wherein the instructions, when executed by the at least one processor, cause the device to:
 trigger a workflow, performed independent of the chatbot, in response to completing the conversation with the first user, wherein the workflow comprises the message of the first user.

11. A method comprising:
 accessing a paper-based form document and exposing an image of the paper-based form document to a chatbot, wherein the chatbot is configured to engage in a conversation, based on a first conversation model, with a first user, and wherein content of the image of the paper-based form document controls in part the conversation;
 setting, based on a message from the first user in response to information provided by the chatbot, a response value for the information provided by the chatbot via a chat interface associated with the first conversation model; and
 rendering, based on the response value and to another conversation model, the information provided by the chatbot in the first conversation model.

12. The method of claim 11, wherein the rendering is further based on one or more responses received from the first user during the conversation.

13. The method of claim 11, wherein the conversation, based on the first conversation model and associated with the image of the paper-based form document, is an interactive conversation between the chatbot and the first user.

14. The method of claim 13, wherein the conversation between the chatbot and the first user comprises a request for the first user to verify the message.

15. The method of claim 11, wherein the first conversation model comprises explanatory text within the image of the paper-based form document and interrogatory text within the image of the paper-based form document.

16. The method of claim 15, further comprising:
 parsing the explanatory text within the image of the paper-based form document;
 parsing the interrogatory text within the image of the paper-based form document; and
 generating vector representations of the explanatory text and vector representations of the interrogatory text.

17. The method of claim 16, further comprising:
 providing a plurality of chatbot generators, each configured to automatically create a chatbot for a different one of a plurality of different communication interfaces.

18. The method of claim 16, further comprising:
 determining, based on the interrogatory text and the explanatory text, a validation model for the information provided by the chatbot; and
 determining, based on the validation model and the information provided by the chatbot, that the message from the first user is valid.

19. The method of claim 11, further comprising:
 triggering a workflow, performed independent of the chatbot, in response to completing the conversation with the first user, wherein the workflow comprises the message of the first user.

20. A non-transitory computer readable medium comprising computer-executable instructions that, when executed, cause performance of:
 accessing a paper-based form document and exposing an image of the paper-based form document to a chatbot, wherein the chatbot is configured to engage in a conversation, based on a first conversation model, with a first user, and wherein content of the image of the paper-based form document controls in part the conversation;
 setting, based on a message from the first user in response to information provided by the chatbot, a response value for the information provided by the chatbot via a chat interface associated with the first conversation model; and
 rendering, based on the response value and to another conversation model, the information provided by the chatbot in the first conversation model.

* * * * *